US 7,038,574 B1

(12) United States Patent
Schlesener et al.

(10) Patent No.: US 7,038,574 B1
(45) Date of Patent: May 2, 2006

(54) PACKET DIFFERENTIATION SERVICES

(75) Inventors: Matthew C. Schlesener, Olathe, KS (US); Pallavur A. Sankaranaraynan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 129 days.

(21) Appl. No.: 10/867,937

(22) Filed: Jun. 14, 2004

(51) Int. Cl.
*G08B 9/00* (2006.01)

(52) U.S. Cl. .................. 340/286.02; 370/392; 709/240

(58) Field of Classification Search ........... 340/286.02, 340/539.1; 370/392, 401, 412; 709/239, 709/240
See application file for complete search history.

(56) References Cited

U.S. PATENT DOCUMENTS

| | | | |
|---|---|---|---|
| 5,544,315 A * | 8/1996 | Lehfeldt et al. | 709/236 |
| 5,761,534 A * | 6/1998 | Lundberg et al. | 710/50 |
| 6,600,744 B1 * | 7/2003 | Carr et al. | 370/392 |
| 6,650,238 B1 * | 11/2003 | Britton | 340/539.1 |
| 6,795,447 B1 * | 9/2004 | Kadambi et al. | 370/412 |
| 6,842,107 B1 * | 1/2005 | Takemura et al. | 340/286.02 |
| 6,925,514 B1 * | 8/2005 | Brown et al. | 710/105 |
| 6,965,599 B1 * | 11/2005 | Sakurai et al. | 370/392 |

OTHER PUBLICATIONS

Schlesener, Matthew C., Performance Evaluation of Telephony Routing over IP (TRIP), B.S.E.E. Kansas State University, Fall 1996, submitted to the Department of Electrical Engineering and Computer Science and the Faculty of the Graduate School of the University of Kansas in partial fulfillment of the requirements for the degree of Master's of Science.

* cited by examiner

*Primary Examiner*—John Tweel, Jr.

(57) ABSTRACT

A communication network comprising a routing system, a media gateway coupled to the routing system, and a network element coupled to the routing system. The media gateway, responsive to a status change of the media gateway, transfers a first packet for a location server to the routing system which indicates the type and wherein the type of the first packet comprises an update message. The network element transfers a second packet for a destination which indicates the type and wherein the type does not comprise an update message. The routing system processes the first packet to determine a first class of service based on the type of the first packet and processes the second packet to determine a second class of service based on the type of the second packet wherein the first class of service is higher than the second class of service.

21 Claims, 6 Drawing Sheets

PACKET DIFFERENTIATION SERVICES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to packet network technologies, and in particular, to packet differentiation services.

2. Description of the Prior Art

Packet based communication networks package and transmit communications based on packet protocols. Recent advances in packet based communications have resulted in an expansion of packet based voice communication networks. Voice over Internet Protocol (VoIP) typifies modern packet based voice communication protocols. VoIP networks digitize, compress, and convert voice communications to IP packets. Most VoIP networks include network elements such as media gateways and locations servers. Media gateways extend VoIP calls between and across network domains. Location servers have responsibility for controlling media gateways and tracking the location and status of media gateways. Specialized signaling protocols are employed by media gateways and location servers to set up and tear down VoIP calls and to locate and track media gateways.

Session Initiation Protocol (SIP) is an example of a popular VoIP signaling protocol well known to those skilled in the art. SIP provides advanced signaling and control to VoIP networks for initiating, managing, and terminating VoIP network sessions, or calls. A typical SIP enabled VoIP network includes proxy servers which run the location servers. Such a network also includes user agents and media gateways.

User agents are the end users of a SIP network. For example, a SIP enabled phone is a user agent. User agents can be the origin or destination for a call over a VoIP network. Media gateways interwork communications between network domains. Often times, media gateways interwork communications between a VoIP network and the public switched telephone network (PSTN). Other times, media gateways interwork communications between two VoIP networks or otherwise packet based networks.

Proxy servers (also sometimes referred to as media gateway controllers) provide registration, redirect, and location services implemented by registrar, redirect, and location server applications running on the proxy servers. In particular, registrar servers manage user agents assigned to their network domains. Redirect servers redirect SIP messages to their appropriate destinations and return location information in response to queries. Location servers share responsibility for knowing the location and status of each gateway.

Telephony Routing over Internet Protocol (TRIP) is a well known protocol established to effectuate messaging between location servers and gateways to keep track of the location and status of the gateways. TRIP does not run directly over IP—it must ride over a telephony protocol like SIP or H.323. IP does not provide the infrastructure (e.g. SIP proxy server and media gateway) nor the packet structure to provide what TRIP needs to do its very specific job (dynamic building of proxy server routing tables). In a SIP only network, location servers are not utilized; rather, the proxy server will use standard Domain Name Service (DNS) methods to determine where to forward call requests. In a TRIP enabled SIP network, the location server builds a dynamic routing table based on TRIP update messages transmitted from various media gateways and location servers. The location server then accesses the resulting TRIP routing table to determine where to forward and redirect call requests.

TRIP enabled location servers are often referred to as TRIP speakers. A scaled down version of TRIP called TRIP-lite can be implemented on gateways. TRIP-lite transmits messaging from a gateway to at least one location server advertising the available routes and prefixes accessible through that gateway. For example, a first TRIP-lite enabled gateway might advertise to a location server that it services the 913 area code of the public switched telephone network (PSTN), while a second TRIP-lite enabled gateway advertises to the location server that it services the 816 area code of the PSTN. Thus, when a call request indicating a PSTN area code of 913 arrives into the location server, the location server knows to route that call to the first TRIP-lite enabled gateway. Other attributes advertised by TRIP-lite enabled gateways include destination prefixes, capacity to each prefix destination, and utilization levels of each trunk group terminating at the gateway, as well as other attributes. TRIP-lite allows location servers to have real-time knowledge of available gateway resources.

Unfortunately, current VoIP networks do not provide traffic conditioning capabilities for TRIP messaging. In the prior art, services such as Differentiated Service (DiffServ) use type of service (ToS) indicators to indicate a class of service to be implemented for different types of traffic. For example, voice traffic receives a higher class of service than data traffic. However, such traffic conditioning in the prior art does not differentiate between voice and data traffic and TRIP update messages. Furthermore, such traffic conditioning does not differentiate between the various types of TRIP update messages. Thus, VoIP network elements apply a constant class of service to all types of TRIP traffic regardless of the type of traffic. The current situation leads to undesirable periods of traffic congestion in network elements.

SUMMARY OF THE INVENTION

An embodiment of the invention solves the above problems as well as other problems by providing systems, methods, and software that determines class of service for packets based on the type of the packet. A communication network in an embodiment of the invention comprises a routing system, a media gateway coupled to the routing system, and a network element coupled to the routing system. The media gateway, responsive to a status change of the media gateway, transfers a first packet for a location server to the routing system wherein the first packet indicates the type of the first packet and wherein the type of the first packet comprises an update message. The network element transfers a second packet for a destination wherein the second packet indicates the type of the second packet wherein the type of the second packet does not comprise an update message. The routing system, responsive to receiving the first packet and the second packet, processes the first packet to determine a first class of service for the first packet based on the type of the first packet and processes the second packet to determine a second class of service for the second packet based on the type of the second packet wherein the first class of service is higher than the second class of service.

In another embodiment of the invention, the communication network further comprises the location server coupled to the routing system. The location server transfers a third packet to the routing system wherein the third packet indicates the type of the third packet and wherein the type of the third packet comprises an update message. The routing system, responsive to receiving the third packet, processes the third packet to determine a third class of service for the third packet based on the type of the third packet wherein the first class of service is higher than the third class of service and wherein the third class of service is higher than the second class of service.

In another embodiment of the invention, the routing system, responsive to entering a period of congestion, drops the second packet to relieve the period of congestion based on a determination that the second class of service for the second packet is the lowest class of service between the first class of service for the first packet, the second class of service for the second packet, and the third class of service for the third packet.

In another embodiment of the invention, the first packet comprises a first telephony routing over internet protocol (TRIP) update message.

In another embodiment of the invention, the first TRIP update message indicates a failure state of the media gateway.

In another embodiment of the invention, the third packet comprises a second telephony routing over internet protocol (TRIP) update message.

In another embodiment of the invention, the second TRIP update message indicates an accounting metric.

In another embodiment of the invention, the media gateway comprises a telephony routing over internet protocol (TRIP) enabled media gateway.

In another embodiment of the invention, the location server comprises a telephony routing over internet protocol (TRIP) enabled location server.

In another embodiment of the invention, the second packet comprises a data packet.

BRIEF DESCRIPTION OF THE DRAWINGS

The same reference number represents the same element on all drawings.

DETAILED DESCRIPTION OF THE PREFERRED EMBODIMENT

FIGS. 1–6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
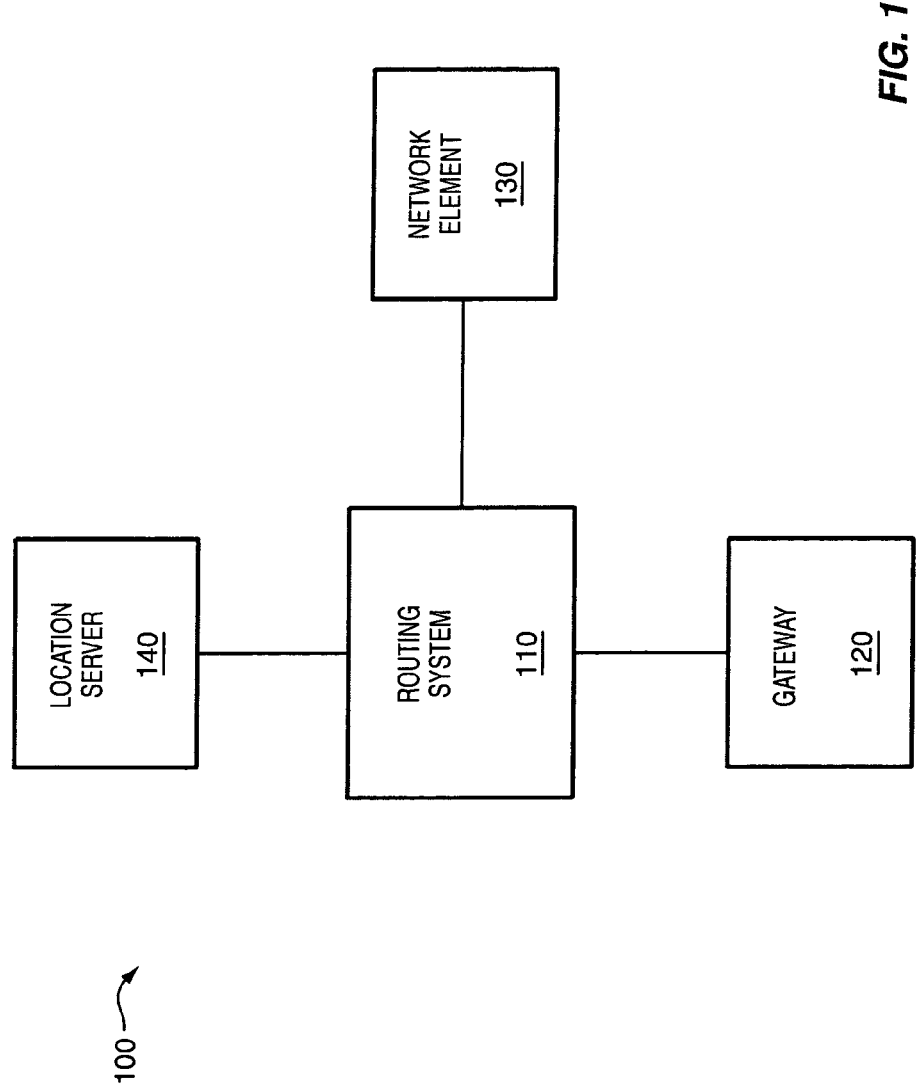
FIG. 1 illustrates a communication network in an embodiment of the invention.
Figure 2:
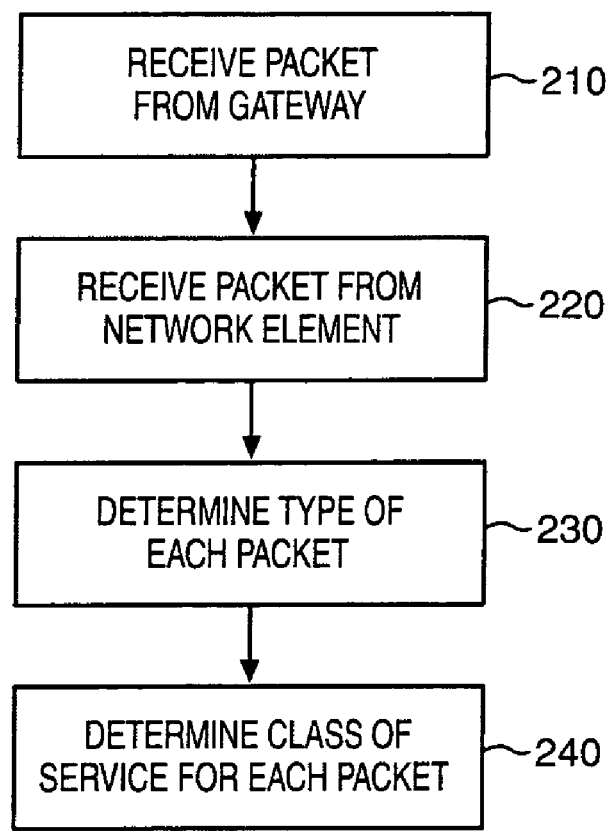
FIG. 2 illustrates the operation of the communication network of FIG. 1 in an embodiment of the invention.

First Embodiment Configuration and Operation—FIGS. 1–2

FIG. 1 illustrates communication network 100 in an embodiment of the invention. Communication network 100 includes routing system 110, gateway 120, network element 130, and location server 140. Routing system 110 comprises any element or collection of elements capable of routing packets. As is well known in the art, routing system 110 could include, for example, an Internet router. Routing system 110 could also comprise a routing network such as the Internet, as well as some other packet network. Gateway 120 is in communication with location server 140 through routing system 110. Similarly, network element 130 is in communication with location server 140 and gateway 120 over routing system 110.

Gateway 120 is any element that provides an ingress or egress point to a network, domain of a network, or some other network entity. For example, gateway 120 could interface between a first network and a second network. In another example, gateway 120 could convert communications between two networks from a first format or protocol to a second format or protocol. Gateway 120 could also interface between a first domain and a second domain of a network. Gateway 120 is commonly referred to in the art as a media gateway. Gateway 120 is also any gateway capable of transmitting update messages to location server 140. The update messages indicate the status of any of the networks, domains, or other entities served by gateway 120.

Location server 140 is any element that controls gateway 120. Location server 140 is a logical entity that runs on what is commonly referred to as a proxy server. Location servers 140 are sometimes referred to in the art as media gateway controllers. Location server 140 tracks the status and location of gateways assigned to it such as gateway 120. Location server 140 also tracks the status and location of other gateways assigned to other location servers by way of update messages transmitted from the other location servers.

Network element 130 is any kind of network element that transmits packets over routing system 110. Network element 130 could be another gateway, another location server, or any other type of communication or computing device such as a server, a firewall, a portable computer, a handheld computer, or a mobile phone. While FIG. 1 only illustrates certain network elements, it is understood that other elements are possible and have been omitted for the sake of clarity. Additionally, intermediary elements between the illustrated elements have been omitted for the sake of clarity.

However, it is understood that the described elements and their operations provide sufficient detail to teach one skilled in the art how to make and use the best mode of the invention.

FIG. 2 illustrates the operation of communication network 100 in an embodiment of the invention. In this embodiment, gateway 120 undergoes a status change. The status change could be a failure of gateway 120, an increase in available capacity, a decrease in available capacity, offering new capabilities, as well as other status changes. In response to the status change, gateway 120 transfers a packet to routing system 110 (Step 210) for location server 140. The packet indicates that the packet is an update message to update location server 140 on the status change experienced by gateway 120.

At nearly the same moment, network element 130 transfers a packet to routing system 110 (Step 220) for a destination. The destination of the packet from network element could be another network element within communication network 100. Alternatively, the destination could be a destination within another communication network. The packet from network element 130 indicates the type of the packet. In this embodiment, network element 130 is not a media gateway. However, network element 110 could be, for example, a computing device used by a user for data transfer such as e-mail. Thus, the type of the packet comprises a data packet.

Upon receiving the two packets, routing system 110 processes both packets to determine the type of each packet (Step 230). In the first case, the packet is determined to be an update message. In the second case, the packet is determined to be a data packet. Next, routing system 110 processes each packet to determine a class of service for each packet based on the type of each packet (Step 240). In this embodiment, routing system 110 determines a higher class of service for the update message packet than for the data packet. As each packet progresses through routing system towards their respective destinations, the packets are tagged with a class of service identification and receive service commensurate with their class of service. For example, some routing elements discard packets in times of congestion. However, update messages often contain critical information that should not be discarded. With a high class of service indicator, the update message will not be discarded by a congested routing element, whereas the data packet will receive a lower class of service and could be susceptible to being discarded. Importantly, the update message packet receives a higher class of service from routing elements than the data packet.

Figure 3:
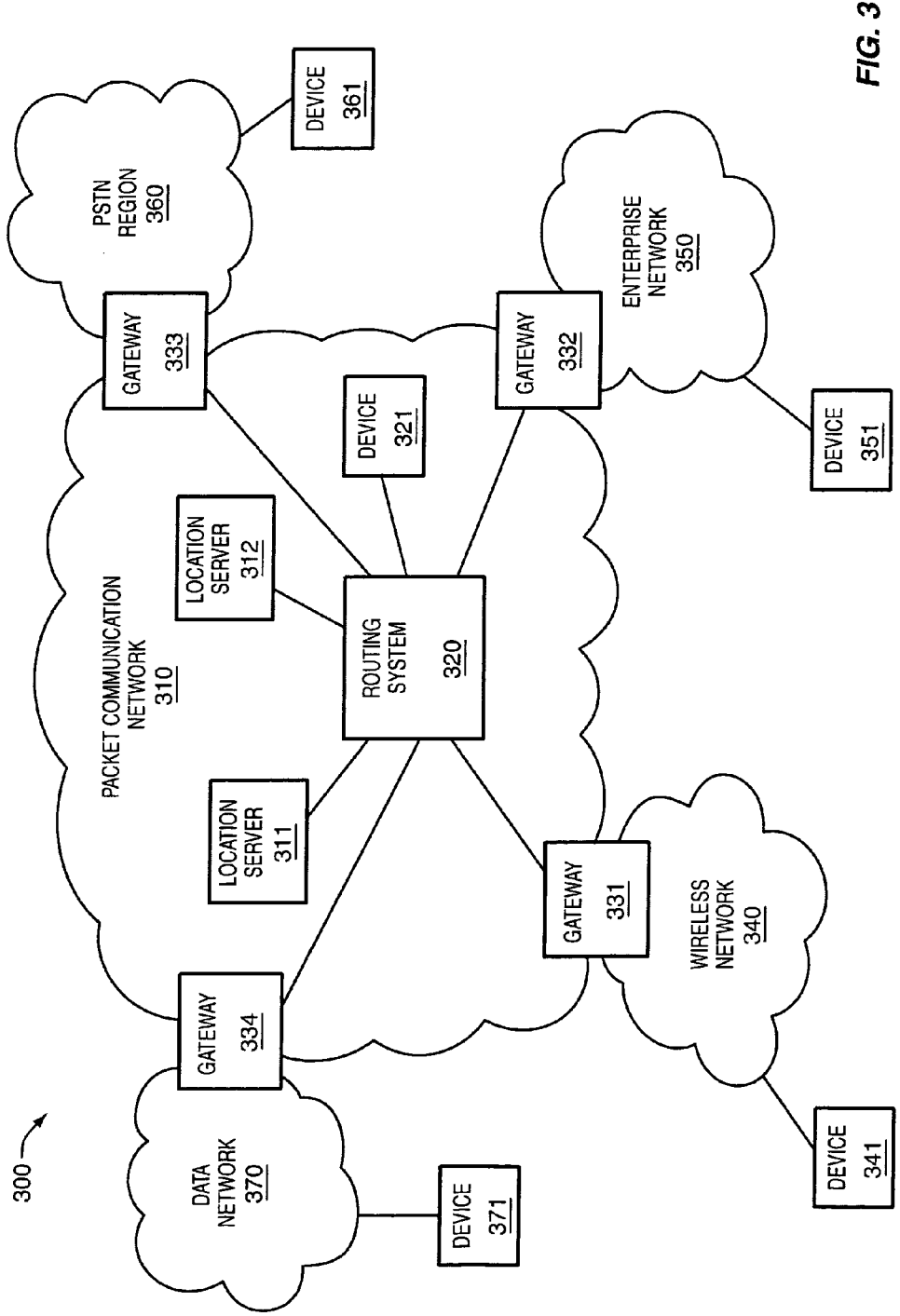
FIG. 3 illustrates a communication network in an embodiment of the invention.
Figure 4:
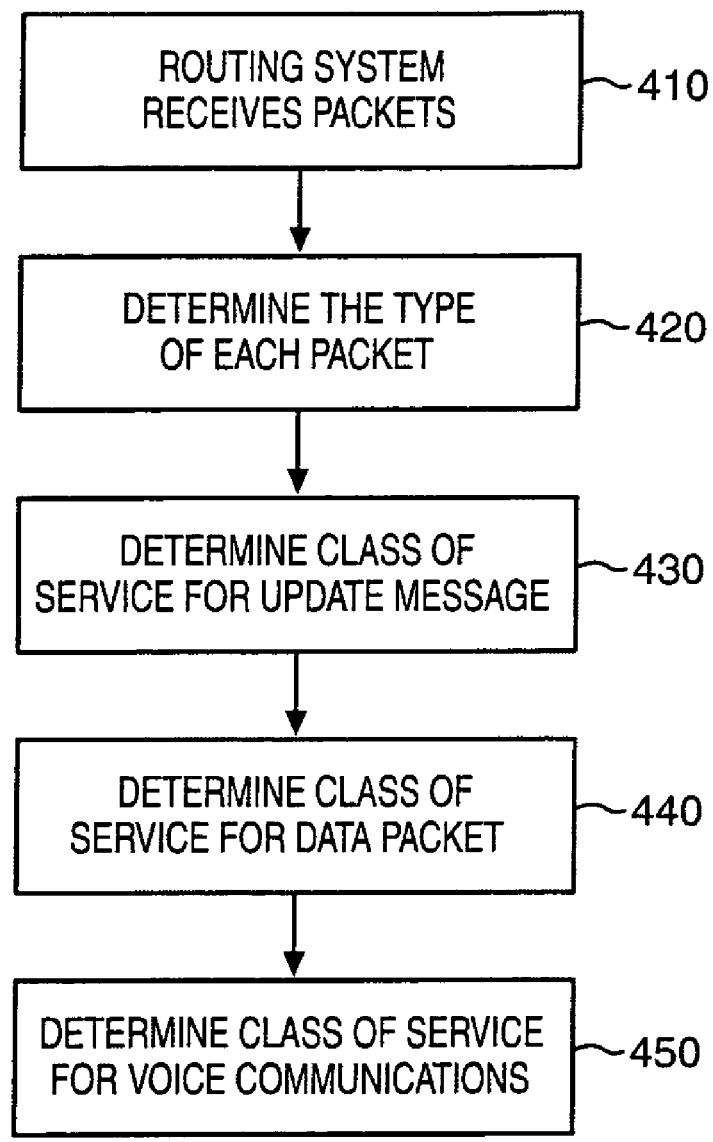
FIG. 4 illustrates the operation of the communication network of FIG. 3 in an embodiment of the invention.

Second Embodiment Configuration and Operation—FIGS. 3–4

FIG. 3 illustrates communication network 300 in an embodiment of the invention. Communication network 300 includes packet communication network 310, wireless network 340, enterprise network 350, PSTN region 360, and data network 370. Packet communication network 310 includes routing system 320, device 321, location server 311, and location server 312. Gateway 331 couples packet communication network 310 to wireless network 340. Gateway 332 couples packet communication network 310 to enterprise network 350. Gateway 333 couples packet communication network 310 to PSTN region 360. Gateway 334 couples packet communication network 310 to data network 370. Device 371 is coupled to data network 370. Device 341 is coupled to wireless network 340. Device 351 is coupled to enterprise network 350. Device 361 is coupled to PSTN region 360.

In an embodiment of the invention, location server 311 monitors the status and location of gateways 331 and 334. Similarly, location server 312 monitors the status and location of gateways 332 and 333. Gateways 331, 332, 333, and 334 comprise TRIP-lite enabled gateways. TRIP-lite is sometimes commonly referred to as TRIP-GW (gateway) by those skilled in the art. Location servers 311 and 312 are TRIP and SIP enabled location servers. Routing system 320 routes packets in a manner well known to those in the art. Routing system 320 could include routing elements such as packet routers, as well as other routing elements.

Gateway 331 provides a gateway between wireless network 340 and packet communication network 310. Similarly, gateway 322 provides a gateway between packet communication network 310 and enterprise network 350. Gateway 333 provides a gateway between packet communication network 310 and PSTN region 360. Gateway 334 provides a gateway between data network 370 and packet communication network 310. Gateways 331, 332, 333, and 334 interwork communications between networks as is well known in the art. For example, gateway 333 interworks communications from a non-packet based format from PSTN region 360 to packet format for packet communications network 310.

Gateways that interface between two packet networks are often times commonly referred to in the art as border controllers. For example, gateway 332 interfaces between enterprise network 350, which is a packet based network, and packet communication network 310. Therefore, gateway 332 does not need to convert communications to or from packet formats. However, gateway 332 may have to change addressing schemes or information included with the packets.

In this embodiment of the invention, device 321 comprises a SIP enabled agent, such as a mobile phone or personal digital assistant (PDA). Device 341 comprises a mobile communication device, such as a wireless phone, PDA, or other similar devices. Device 341 is in communication over wireless network 340. Device 351 comprises a communication device in communication with enterprise network 350. For example, device 351 could be a desktop computer, a server, a phone, or other similar devices typically found within enterprise network 350. Device 361 comprises a telephone in communication over PSTN region 360. PSTN region 360 is, for example, an area of the PSTN identified by a particular area code. Device 371 is a device in communication through data network 370. For example, device 371 could be a computer, a server, a database system, as well as other types of computing or communication devices.

Upon starting device 321, a SIP message is transmitted from device 321 to location server 312 alerting location server 312 to the existence of device 321 in packet communication network 310. Gateways 331 and 334 are in communication with location server 311 regarding the status of each gateway. Location server 311 contains TRIP routing tables that hold routing information relevant to routing calls or data sessions through gateways 331 and 334. Similarly, gateways 332 and 333 are in communication with location server 312 regarding the status of each gateway. Location server 312 contains TRIP routing tables that hold routing information relevant to routing calls or data sessions through gateways 332 and 333. Location server 311 also floods other location servers (not shown) and location server 312 with update messages regarding the status of its gateways 331 and 334. Likewise, location server 312 floods other location servers (not shown) and location server 312 with update messages regarding the status of its gateways 332 and 333.

FIG. 4 illustrates the operation of communication network 300 in an embodiment of the invention. In operation, a user using device 321 has initiated a call to a destination. To setup the call, device 321 transfers a SIP invite message which is processed by location server 312 to determine a route for the call. Upon setting up the call, device 321 transmits packets to routing system 320 for the destination. The packets contain voice communications and are considered voice packets.

Also in operation, device 371 transmits data packets over data network 370 to a destination. The data packets could contain information that is not time sensitive such as an e-mail. Packets from data network 370 are interworked by gateway 334 to routing system 320 of packet communication network 310.

Also in operation, gateway 333 undergoes a status change. For example, a switch in PSTSN region 360 coupled to gateway 333 could lose service for various reasons. In response to the status change, gateway 333 transmits an update message in packet form to location server 312. The update message indicates the status change and the gateway. The packet is transmitted from gateway 333 to routing system 320.

In this embodiment of the invention, routing system 320 receives the packets from device 321, data network 370, and gateway 333 (Step 410). It is understood that routing system 320 nearly simultaneously receives numerous other packets. However, for purposes of clarity, the present example using three packets suffices. Routing system 320 next determines the type of each packet (Step 420). The packet from device 321 is a voice packet. The packet from data network is a data packet. The packet from gateway 333 is an update message packet.

After determining the type of each packet, routing system 320 determines a class of service for the update message packet (Step 430). Update messages receive a high class of service due to the critical nature of the information included in the messages. In this case, information related to a route to PSTN region 360 going offline is significant and receives a high class of service. Next, routing system 320 determines a class of service for the data packet (Step 440). In this example, the data packet receives a class of service rating less than the class of service rating determined for the update message. Typically, data packets receive lower class of service designations because they are not time sensitive. Lastly, routing system 320 determines a class of service level for the voice packet (Step 450). Voice packets receive a class of service rating higher than the class of service rating for the update message. Thus, in order of relative class of service, routing system 320 will treat voice packets with the highest class of service, update messages with an intermediary class of service, and data packets with the lowest class of service.

In another embodiment of the invention, gateway 332 undergoes a status change with respect to enterprise network 350. For example, assuming enterprise network 350 comprised a single initial domain, location server 312 would store the domain in association with gateway 332 in a routing table. If enterprise network 350 adds a second domain, gateway 332 would be notified of the addition by enterprise network 350. In response to the domain addition, gateway 332 transmits an update message in packet form to location server indicating the status change.

In this embodiment, routing system 320 has received two update messages—the first from gateway 333, and the second from gateway 332. Therefore, in addition to determining a class of service based on the packets being update messages, routing system 320 can further determine priority between the two update messages. In this embodiment, routing system 320 determines that the first packet from gateway 333 should receive a higher class of service than the second packet from gateway 332 because a route failure update message is more critical than a new domain update message. Therefore, the relative order packets according to their determined class of service from highest to lowest comprises the voice of packets, route failure update message packets, new domain update message packets, and data packets.

Figure 5:
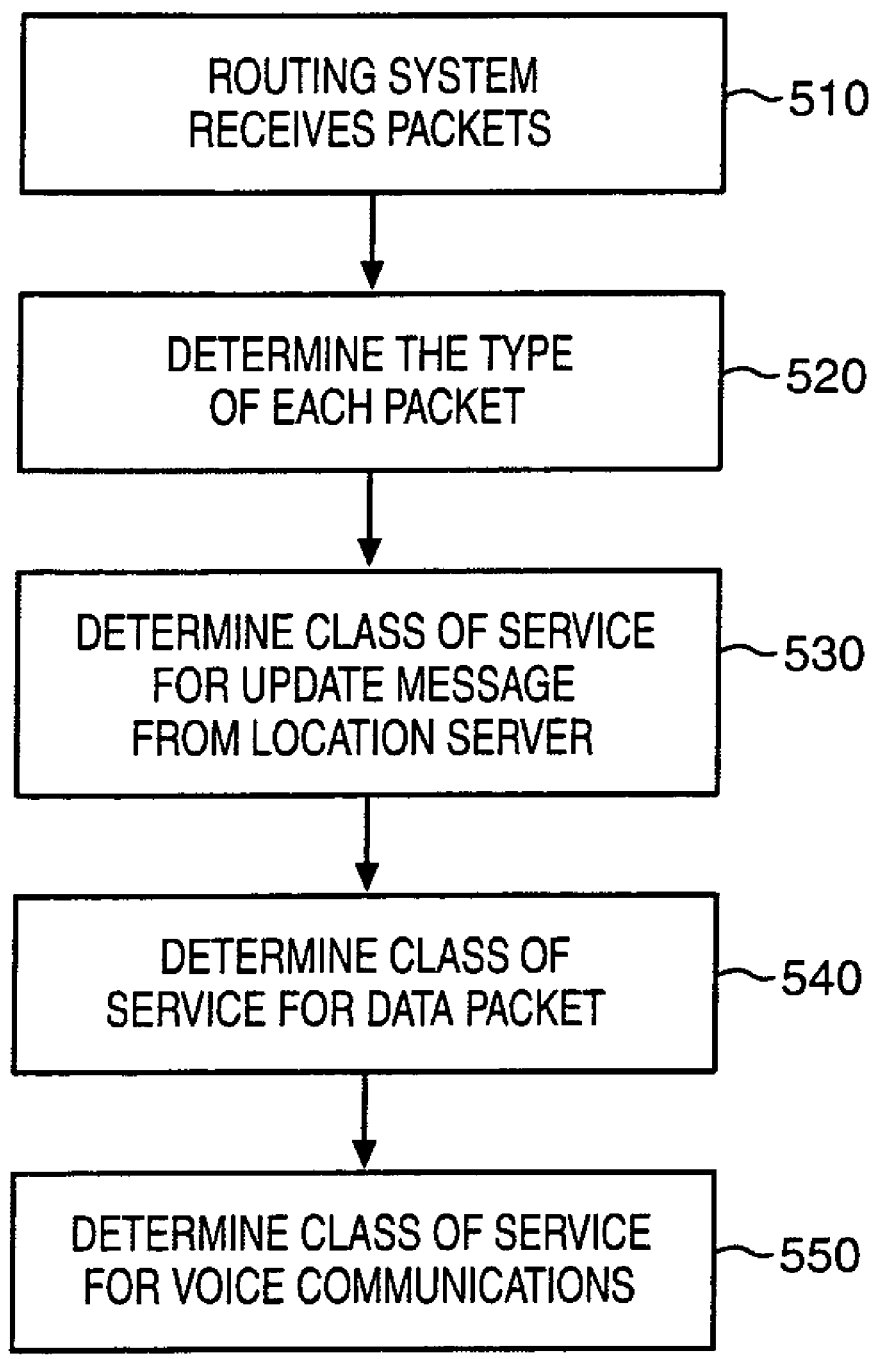
FIG. 5 illustrates the operation of the communication network of FIG. 3 in an embodiment of the invention.

FIG. 5 illustrates the operation of communication network 300 in an embodiment of the invention. In operation, a user using device 321 has initiated a call to a destination. To setup the call, device 321 transfers a SIP invite message which is processed by location server 312 to determine a route for the call. Upon setting up the call, device 321 transmits packets to routing system 320 for the destination. The packets contain voice communications and are considered voice packets.

Also in operation, device 371 transmits data packets over data network 370 to a destination. The data packets could contain information that is not time sensitive such as an e-mail. Packets from data network 370 are interworked by gateway 334 to routing system 320 of packet communication network 310.

Also in operation, location server 312 has received an update message from gateway 333 which has undergone a status change. For example, a switch in PSTN region 360 coupled to gateway 333 could lose service for various reasons. In response to the status change, gateway 333 transmitted an update message in packet form to location server 312. The update message indicates the status change and the gateway. After processing the update message, location server 312 floods other location servers including location server 311 with an update message on the status of gateway 333. Location server 312 transfers packets with the update message to routing system 320 for location server 311.

In this embodiment of the invention, routing system 320 receives the packets from device 321, data network 370, and location server 312 (Step 510). It is understood that routing system 320 nearly simultaneously receives numerous other packets. However, for purposes of clarity, the present example using three packets suffices. Routing system 320 next determines the type of each packet (Step 520). The packet from device 321 is a voice packet. The packet from data network is a data packet. The packet from location server 312 is an update message packet.

After determining the type of each packet, routing system 320 determines a class of service for the update message packet (Step 530). Update messages receive a high class of service due to the critical nature of the information included in the messages. In this case, information related to a route to PSTN region 360 going offline is significant and receives a high class of service. Next, routing system 320 determines a class of service for the data packet (Step 540). In this example, the data packet receives a class of service rating less than the class of service rating determined for the update message. Typically, data packets receive a lower class of service designations because they are not time sensitive. Lastly, routing system 320 determines a class of service level for the voice packet (Step 550). Voice packets receive a class of service rating higher than the class of service rating for the update message. Thus, in order of relative class of service, routing system 320 will treat voice packets with the highest class of service, update messages with an intermediary class of service, and data packets with the lowest class of service.

Advantageously, communication network 300 provides for a differentiated class of service levels among packets. Additionally, communication network 300 provides for a differentiated class of service levels among voice packets, data packets, update message packets, as well as other types of packets. Importantly, TRIP provides a mechanism by which to distribute gateway and routing information in location servers. Therefore, TRIP update messages have added significance to the operation of a network such as communication network 300. By determining differentiated class of service levels for TRIP update messages relative to other types of messages, communication network 300 allows for improved network performance.

Figure 6:
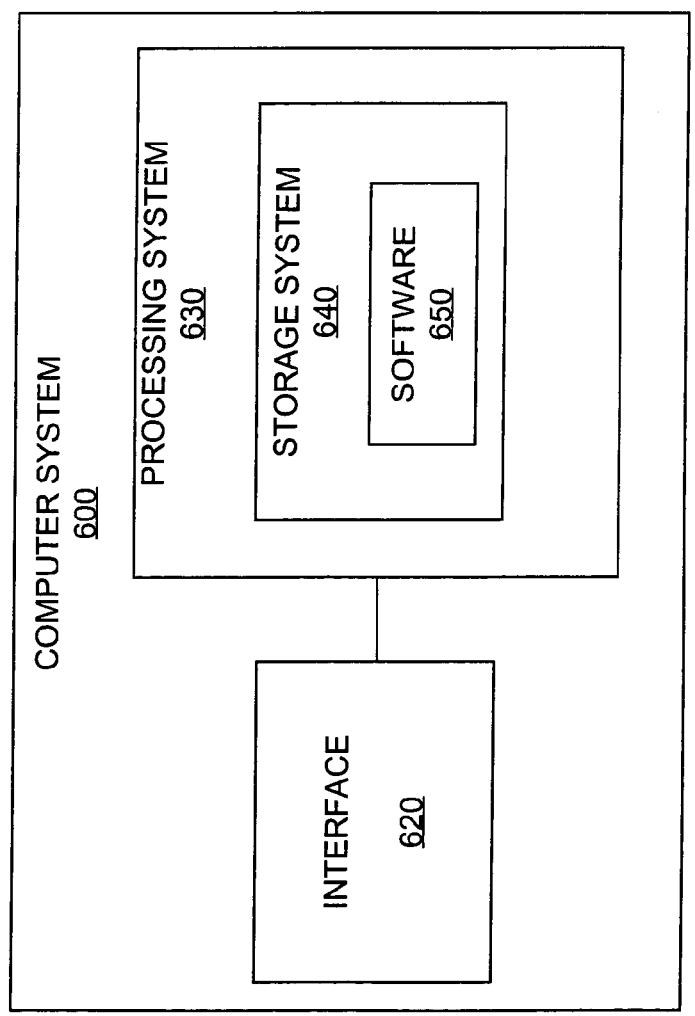
FIG. 6 illustrates a computer system in an embodiment of the invention.

Computer System—FIG. 6

FIG. 6 illustrates computer system 600 in an embodiment of the invention. Computer system 600 includes interface 620, processing system 630, storage system 640, and software 650. Storage system 640 stores software 650. Processing system 630 is linked to interface 620. Computer system 600 could be comprised of a programmed general-purpose computer, although those skilled in the art will appreciate that programmable or special purpose circuitry and equipment may be used. Computer system 600 may use a client server architecture where operations are distributed among a server system and client devices that together comprise elements 620–650.

Interface 620 could comprise a network interface card, modem, port, or some other communication device. Signaling interface 620 may be distributed among multiple communication devices. Interface 630 could comprise a computer microprocessor, logic circuit, or some other processing device. Processing system 630 may be distributed among multiple processing devices. Storage system 640 could comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a general-purpose computer. Software 650 could also comprise an application program, firmware, or some other form of machine-readable processing instructions. When executed by the processing system 630, software 650 directs processing system 630 to operate as described for communication networks 100 and 300 and routing systems 110 and 320.

What is claimed is:

1. A communication network comprising:
   a routing system;
   a media gateway coupled to the routing system; and
   a network element coupled to the routing system;
   the media gateway, responsive to a status change of the media gateway, transfers a first packet for a location server to the routing system wherein the first packet indicates the type of the first packet and wherein the type of the first packet comprises an update message;
   the network element transfers a second packet for a destination wherein the second packet indicates the type of the second packet wherein the type of the second packet does not comprise an update message;
   the routing system, responsive to receiving the first packet and the second packet, processes the first packet to determine a first class of service for the first packet based on the type of the first packet and processes the second packet to determine a second class of service for the second packet based on the type of the second packet wherein the first class of service is higher than the second class of service.

2. The communication network of claim 1 further comprising the location server coupled to the routing system wherein the location server transfers a third packet to the routing system wherein the third packet indicates the type of the third packet and wherein the type of the third packet comprises an update message and wherein the routing system, responsive to receiving the third packet, processes the third packet to determine a third class of service for the third packet based on the type of the third packet wherein the first class of service is higher than the third class of service and wherein the third class of service is higher than the second class of service.

3. The communication network of claim 2 wherein the routing system, responsive to entering a period of congestion, drops the second packet to relieve the period of congestion based on a determination that the second class of service for the second packet is the lowest class of service between the first class of service for the first packet, the second class of service for the second packet, and the third class of service for the third packet.

4. The communication network of claim 1 wherein the first packet comprises a first telephony routing over internet protocol (TRIP) update message.

5. The communication network of claim 4 wherein the first TRIP update message indicates a failure state of the media gateway.

6. The communication network of claim 5 wherein the third packet comprises a second telephony routing over internet protocol (TRIP) update message.

7. The communication network of claim 6 wherein the second TRIP update message indicates an accounting metric.

8. The communication network of claim 1 wherein the media gateway comprises a telephony routing over internet protocol (TRIP) enabled media gateway.

9. The communication network of claim 1 wherein the location server comprises a telephony routing over internet protocol (TRIP) enabled location server.

10. The communication network of claim 1 wherein the second packet comprises a data packet.

11. A method of operating a communication network comprising a routing system a media gateway coupled to the routing system, and a network element coupled to the routing system, the method comprising:
    responsive to a status change of the media gateway, transferring a first packet for a location server from the media gateway to the routing system wherein the first packet indicates the type of the first packet and wherein the type of the first packet comprises an update message;
    transferring a second packet for a destination from the network element to the routing system wherein the second packet indicates the type of the second packet wherein the type of the second packet does not comprise an update message; and
    in the routing system, responsive to receiving the first packet and the second packet, processing the first packet to determine a first class of service for the first packet based on the type of the first packet and processing the second packet to determine a second class of service for the second packet based on the type of the second packet wherein the first class of service is higher than the second class of service.

12. The method of claim 11 further comprising transferring a third packet from the location server to the routing system wherein the third packet indicates the type of the third packet and wherein the type of the third packet comprises an update message and in the routing system, responsive to receiving the third packet, processing the third packet to determine a third class of service for the third packet based on the type of the third packet wherein the first class of service is higher than the third class of service and wherein the third class of service is higher than the second class of service.

13. The method of claim 12 further comprising in the routing system, responsive to entering a period of congestion, dropping the second packet to relieve the period of congestion based on a determination that the second class of service for the second packet is the lowest class of service between the first class of service for the first packet, the second class of service for the second packet, and the third class of service for the third packet.

14. The method of claim 11 wherein the first packet comprises a first telephony routing over internet protocol (TRIP) update message.

15. The method of claim 14 wherein the first TRIP update message indicates a failure state of the media gateway.

16. The method of claim 15 wherein the third packet comprises a second telephony routing over internet protocol (TRIP) update message.

17. The method of claim 16 wherein the second TRIP update message indicates an accounting metric.

18. The method of claim 11 wherein the media gateway comprises a telephony routing over internet protocol (TRIP) enabled media gateway.

19. The method of claim 11 wherein the location server comprises a telephony routing over internet protocol (TRIP) enabled location server.

20. The communication network of claim 1 wherein the second packet comprises a data packet.

21. A software product for operating a call control system, the software product comprising:

software operational when executed by a processor to direct the processor to process a first update message received from a gateway coupled to a plurality of network nodes and configured to interwork communications between the plurality of network nodes wherein the first update message indicates the gateway, a first status change associated with a first network node of the plurality of network nodes, and the first network node, and process the first update message to determine a first user associated with the first network node and to determine a first priority for the first update message based on the first user associated with the first network node; and a storage medium configured to store the software.

* * * * *